United States Patent
Tashiro et al.

(10) Patent No.: US 12,242,061 B2
(45) Date of Patent: Mar. 4, 2025

(54) OPTICAL SYSTEM AND OBSERVATION APPARATUS HAVING THE SAME

(71) Applicant: CANON KABUSHIKI KAISHA, Tokyo (JP)

(72) Inventors: Yoshihisa Tashiro, Tochigi (JP); Kazutaka Inoguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 18/061,521

(22) Filed: Dec. 5, 2022

(65) Prior Publication Data

US 2023/0185094 A1 Jun. 15, 2023

(30) Foreign Application Priority Data

Dec. 10, 2021 (JP) .................................. 2021-201273

(51) Int. Cl.
*G02B 27/01* (2006.01)

(52) U.S. Cl.
CPC .... *G02B 27/0172* (2013.01); *G02B 2027/011* (2013.01); *G02B 2027/013* (2013.01); *G02B 2027/0138* (2013.01)

(58) Field of Classification Search
CPC .......... G02B 27/0172; G02B 2027/011; G02B 2027/013; G02B 2027/0138
See application file for complete search history.

(56) References Cited

U.S. PATENT DOCUMENTS

| | | | |
|---|---|---|---|
| 8,854,504 B2 | 10/2014 | Tashiro | |
| 10,126,523 B2 | 11/2018 | Tashiro | |
| 11,327,274 B2 | 5/2022 | Tashiro | |
| 2013/0342749 A1 | 12/2013 | Tashiro | |

(Continued)

FOREIGN PATENT DOCUMENTS

| | | | | |
|---|---|---|---|---|
| DE | 69734638 T2 * | 6/2006 | ............. | G02B 17/08 |
| JP | 2015-508182 A | 3/2015 | | |
| WO | 2013/112705 A1 | 8/2013 | | |

OTHER PUBLICATIONS

Extended European Search Reporting issued in corresponding EP Patent Application No. 22212168.3, dated Apr. 11, 2023, pp. 1-11.

*Primary Examiner* — Nelson M Rosario
*Assistant Examiner* — Scott D Au
(74) *Attorney, Agent, or Firm* — Carter, DeLuca & Farrell LLP

(57) ABSTRACT

An optical system is configured to form an enlarged image of a display surface of an image display element and includes, in order from a side of an exit pupil to a side of the display surface, a first half-transmissive reflective surface and a second half-transmissive reflective surface. The optical system has a first optical path on which light from the display surface transmits through the second half-transmissive reflective surface, is reflected by the first half-transmissive reflective surface, is reflected by the second half-transmissive reflective surface, transmits through the first half-transmissive reflective surface, and is guided to the exit pupil, and a second optical path on which light from the side of the exit pupil transmits through the first half-transmissive reflective surface, transmits through the second half-transmissive reflective surface, and is guided to an image sensor.

20 Claims, 6 Drawing Sheets

(56) References Cited

U.S. PATENT DOCUMENTS

| | | |
|---|---|---|
| 2018/0239146 A1 | 8/2018 | Bierhuizen |
| 2020/0073123 A1 | 3/2020 | Martinez |
| 2021/0041948 A1 | 2/2021 | Berkner-Cieslicki |

\* cited by examiner

COMPARATIVE EXAMPLE

OPTICAL SYSTEM AND OBSERVATION APPARATUS HAVING THE SAME

BACKGROUND

Technical Field

One of the aspects of the disclosure relates to an optical system and an observation apparatus having the same.

Description of the Related Art

An observation apparatus has conventionally been known that has functions of magnifying and displaying an original image displayed on an image display element via an eyepiece optical system, and of performing personal authentication using an iris image and visual line detection using a pupil image through an imaging optical system that captures a pupil of an observer. PCT Application, Domestic Publication No. ("JP") 2015-508182 discloses a configuration that uses the same optical system having a free-form surface prism for both an observation optical path for image observation and an imaging optical path for visual line tracking.

The configuration disclosed in JP 2015-508182 may make larger the free-form surface prism and make thicker the optical system in an attempt to increase the viewing angle of the eyepiece optical system.

One conventional configuration that can increase the viewing angle and become thinner is a configuration (triple-pass optical system) that folds the observation optical path on the optical axis using a two-surface half-mirror. In disposing the imaging optical system in the triple-pass optical system, it is conceivable to dispose the imaging optical system outside the eyepiece optical system as illustrated in FIG. 7. However, in this configuration, a large lens outer diameter of the eyepiece optical system having a wide viewing angle causes the imaging angle of the pupil of the observer to be too large and the pupil image and the iris image to be shielded due to the eyelid and eyeball rotations.

SUMMARY

One of the aspects of the disclosure provides a small and thin optical system with a wide viewing angle and high optical performance, and an observation apparatus having the same.

An optical system according to one aspect of the disclosure is configured to form an enlarged image of a display surface of an image display element and includes, in order from a side of an exit pupil to a side of the display surface, a first half-transmissive reflective surface and a second half-transmissive reflective surface. The optical system has a first optical path on which light from the display surface transmits through the second half-transmissive reflective surface, is reflected by the first half-transmissive reflective surface, is reflected by the second half-transmissive reflective surface, transmits through the first half-transmissive reflective surface, and is guided to the exit pupil, and a second optical path on which light from the side of the exit pupil transmits through the first half-transmissive reflective surface, transmits through the second half-transmissive reflective surface, and is guided to an image sensor. An observation apparatus including the above optical system also constitutes another aspect of the disclosure.

Further features of the disclosure will become apparent from the following description of exemplary embodiments with reference to the attached drawings.

DESCRIPTION OF THE EMBODIMENTS

Figure 1:
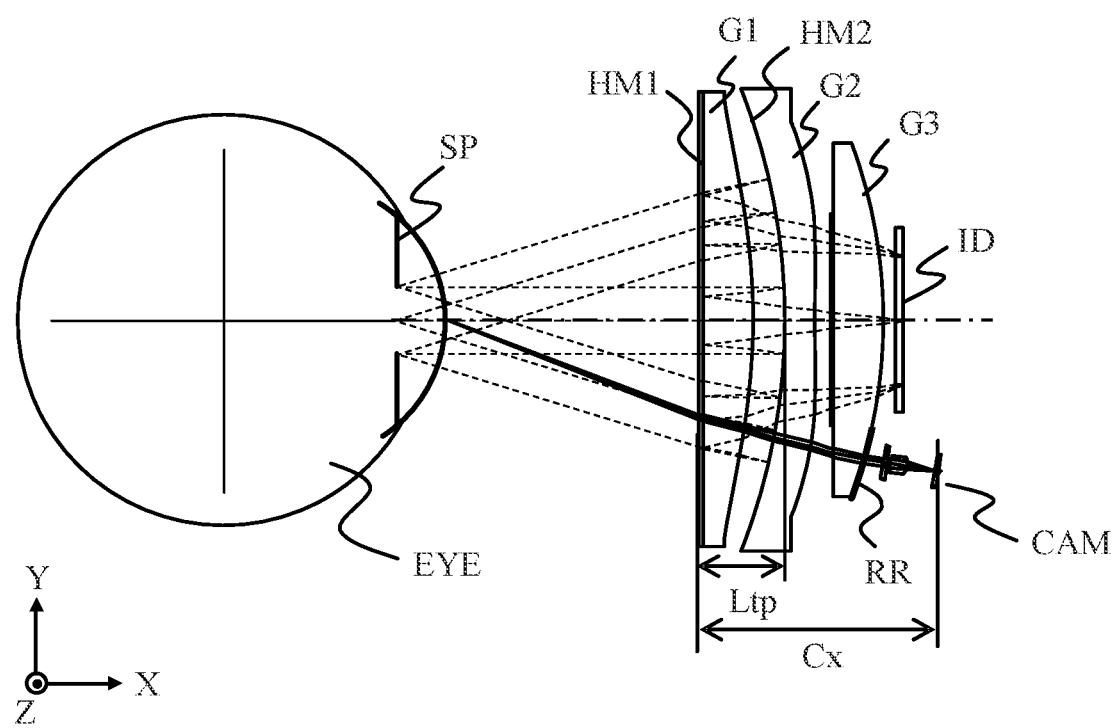
FIG. 1 is a sectional view of an optical system according to example 1.

Referring now to the accompanying drawings, a detailed description will be given of embodiments according to the disclosure. Corresponding elements in respective figures will be designated by the same reference numerals, and a duplicate description thereof will be omitted.

FIGS. 1 to 5 are sectional views of optical systems according to Examples 1 to 5, respectively. The optical system according to each example is an optical system used in an observation apparatus such as a head mount display (HMD), and forms an enlarged image of an image display surface ID of an image display element such as an LCD.

In each sectional view, a left side is a side of an exit pupil (exit pupil side or observation side), and a right side is a side of the image display surface ID. EYE denotes an eye of an observer. SP denotes an exit pupil (pupil plane). CAM denotes a camera having an image sensor.

The optical system according to each example has an observation optical path (first optical path) that guides light from the image display surface ID to the exit pupil SP, and an imaging optical path (second optical path) that guides light from the side of the exit pupil SP to the image sensor. The optical system according to each example includes, in order from the side of the exit pupil SP to the side of the image display surface ID, a first half-transmissive reflective surface HM1 and a second half-transmissive reflective surface HM2. The optical system according to each example includes an eyepiece optical system for magnifying, displaying, and observing an image displayed on the image display surface ID, and an imaging optical system for imaging light from the side of the exit pupil SP on the image sensor. The eyepiece optical system is a coaxial optical system that uses the observation optical path. In the observation optical path, the light from the image display surface ID transmits through the second half-transmissive reflective surface HM2, is reflected by the first half-transmissive reflective surface HM1, is reflected by the second half-transmissive reflective surface HM2, and transmits through the first half-transmissive reflective surface HM1, and is guided to the exit pupil SP. The imaging optical system is an optical system that uses the imaging optical path using part of the eyepiece optical system. In the imaging optical path, the light from the side of the exit pupil SP transmits through the first half-transmissive reflective surface HM1, transmits through the second half-transmissive reflective surface HM2, and is guided to the image sensor. In the imaging optical path, the light from the side of the exit pupil SP is not reflected by the first half-transmissive reflective surface HM1 or the second half-transmissive reflective surface HM2.

Due to the above configuration, the observation optical path has a triple-pass configuration, and the imaging optical path has a single-pass configuration that transmits through at least part of the eyepiece optical system. By disposing the eyepiece optical system with the triple-pass configuration that can realize a thin configuration with a wide viewing angle, and by disposing the imaging optical system on the side of the image display surface ID, an offset amount of the image sensor in a direction orthogonal to the optical axis of the imaging optical path can be reduced. That is, an imaging angle can be reduced on the side of the exit pupil SP in the imaging optical system.

The configuration described above can realize a small and thin optical system with a wide viewing angle and high optical performance.

A description will now be given of a configuration that the optical system according to each example may satisfy.

A refractive area RR may be disposed outside an optically effective area of the observation optical path and inside an optically effective area of the imaging optical path. Here, the outside of the optically effective area means an optically ineffective area. The inside of the optically effective area means being within the optically effective area. In the imaging optical path, the light from the side of the exit pupil SP transmits through the first half-transmissive reflective surface HM1, the second half-transmissive reflective surface HM2, the refractive area RR, and is guided to the image sensor. Thereby, the image sensor can become closer to the optical axis of the eyepiece optical system, and the imaging angle on the side of the exit pupil SP can be reduced in the imaging optical system. In the optical system according to each example, the refractive area RR is a refractive surface.

The refractive surface may be rotationally symmetrical with respect to the optical axis of the observation optical path. Thereby, working of the refractive surface becomes easy in the eyepiece optical system as the coaxial optical system. In a case where a configuration utilizing polarization, which will be described below uses a resin material for a lens constituting the eyepiece optical system, control of molding birefringence becomes important. A rotationally symmetrical lens is advantageous for reducing molded birefringence.

The refractive surface may be a plane (flat surface). Thereby, aberrations that would otherwise occur on the refractive surface can be reduced in the imaging optical system.

An optical element OE that is rotationally asymmetric may be disposed closer to the image sensor than the refractive surface in the imaging optical path. Thereby, aberrations that would otherwise occur in the observation optical system that shares part with the eyepiece optical system can be corrected in the imaging optical system, and the side of the exit pupil SP can be imaged with higher definition. The optically effective surface on the image sensor side of the optical element OE may be a plane. This configuration can reduce aberrations that would otherwise occur on the optically effective surface on the image sensor side of the optical element OE. The optical element OE may be cemented (or joined) with the refractive surface. Thereby, a stable configuration that holds the optical element OE or the like can be made stable.

In the optical system according to each example, the first half-transmissive reflective surface HM1 may be a plane. Using this structure and properly disposing the refractive area RR, the imaging optical system can reduce aberrations that would otherwise occur in the observation optical path that shares part with the eyepiece optical system. For example, in the configuration illustrated in FIG. 5, a common use portion of the imaging optical system and the eyepiece optical system acts as a parallel plate.

The first half-transmissive reflective surface HM1 may be a surface provided to a polarization-selective reflection type polarizing element. A circular polarization conversion element may be disposed on the side of the image display surface ID of the second half-transmissive reflective surface HM2. The circular polarization conversion element may include a linear polarization plate (or polarizer) and a quarter waveplate. This configuration when utilizing polarization, as described below, can shield the single-pass optical path in the eyepiece optical system and realize high-quality virtual image observation. A linear polarization plate may be disposed in the observation optical path. Since no linear polarization plate is disposed in the imaging optical path, a light amount caused by absorption by the polarizing element can be prevented from decreasing.

The optical system according to each example may include a single cemented lens. This configuration can achieve a reduction in thickness including the lens barrel while realizing necessary and sufficient aberration correction.

The optical system according to each example may satisfy the following inequality (1).

$$0.5 < Cx/Ltp < 1.5 \quad (1)$$

where Ltp is a distance on the optical axis of the observation light path from the surface closest to the exit pupil SP to the second half-transmissive reflective surface HM2, and Cx is a distance on the optical axis of the observation optical path from the surface closest to the exit pupil SP to the center of the image sensor.

Inequality (1) defines the arrangement of the imaging optical system. If the value is lower than the lower limit of inequality (1), it becomes difficult to reduce the imaging angle on the side of the exit pupil SP in the imaging optical system and the eyepiece optical system becomes thicker. If the value is higher than the upper limit of inequality (1), the imaging angle can be reduced on the side of the exit pupil SP in the imaging optical system, but the image pickup apparatus CAM becomes thicker.

The numerical range of inequality (1) may be replaced with that of inequality (1a) below.

$$0.7 < Cx/Ltp < 1.3 \quad (1a)$$

The numerical range of inequality (1) may be replaced with that of inequality (1b) below.

$$0.8 < Cx/Ltp < 1.1 \quad (1b)$$

Figure 4:
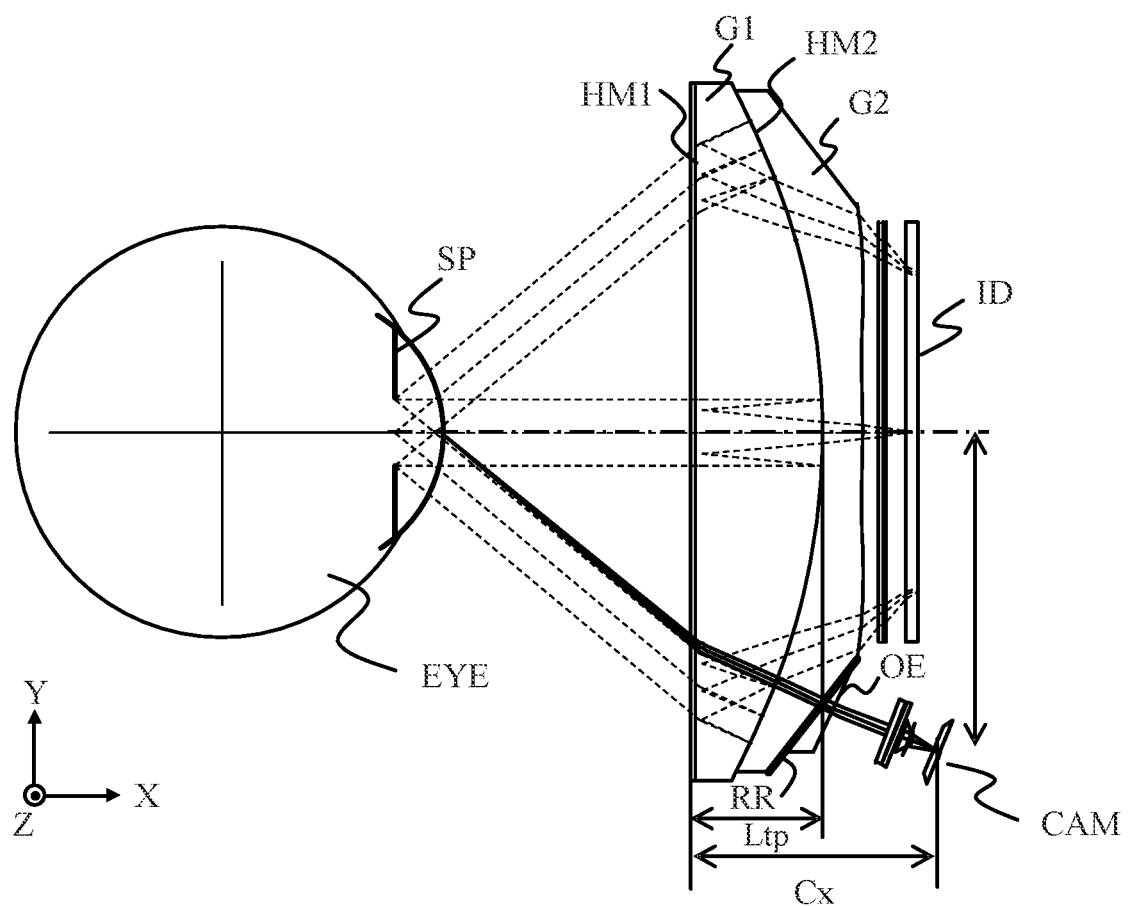
FIG. 4 is a sectional view of an optical system according to example 4.
Figure 5:
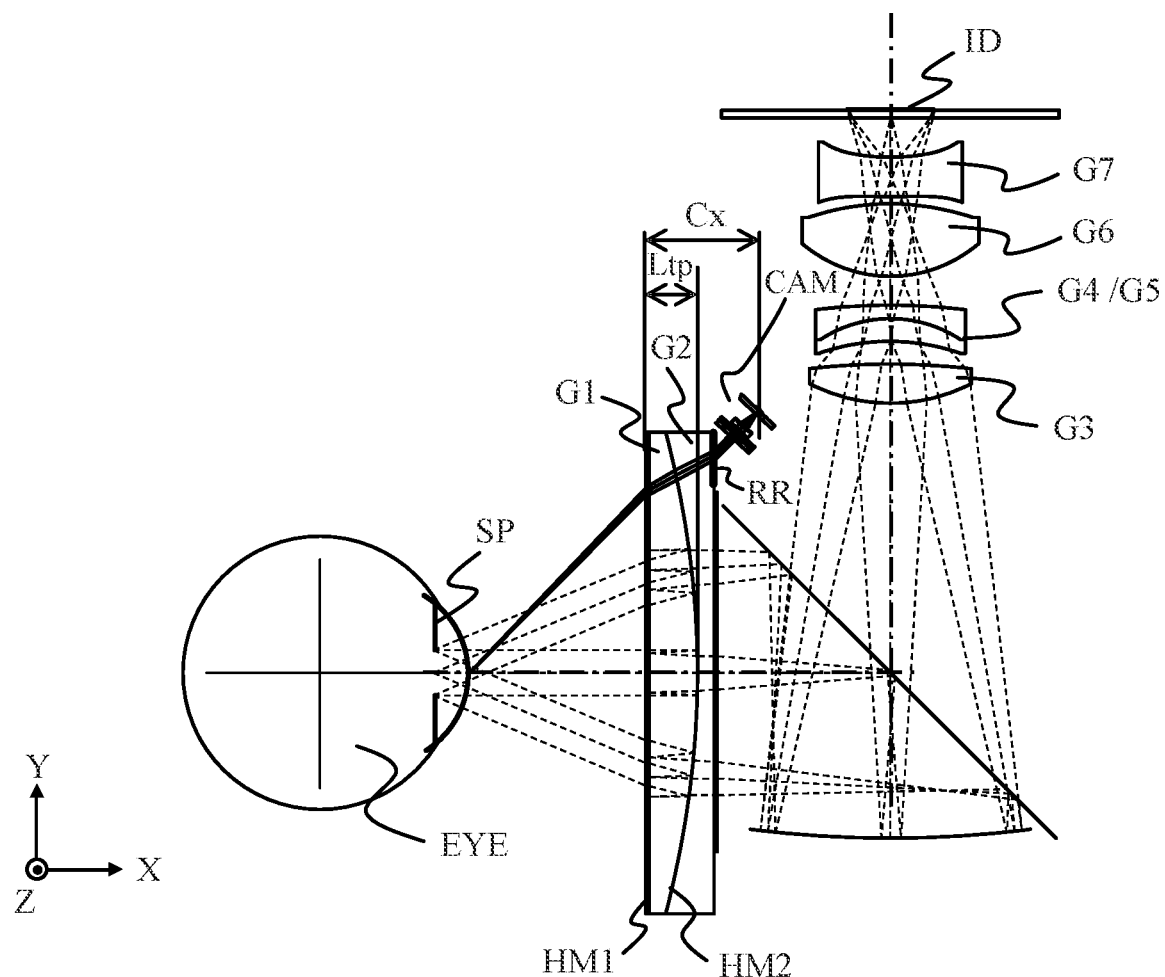
FIG. 5 is a sectional view of an optical system according to example 5.
Figure 6:
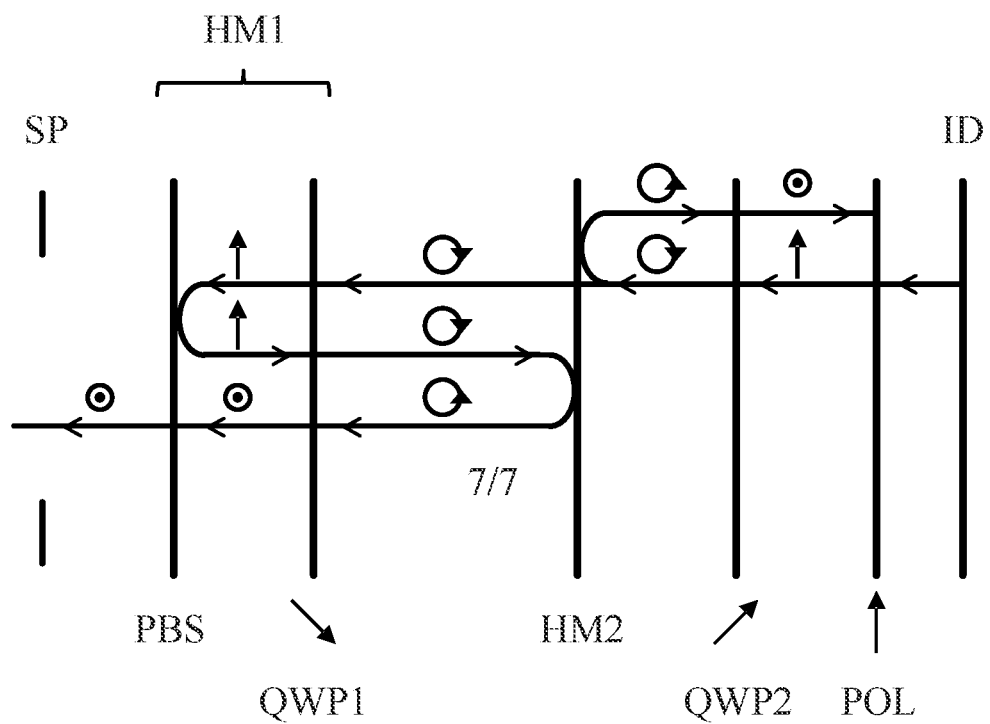
FIG. 6 explains a configuration using polarization for an eyepiece optical system.
Figure 7:
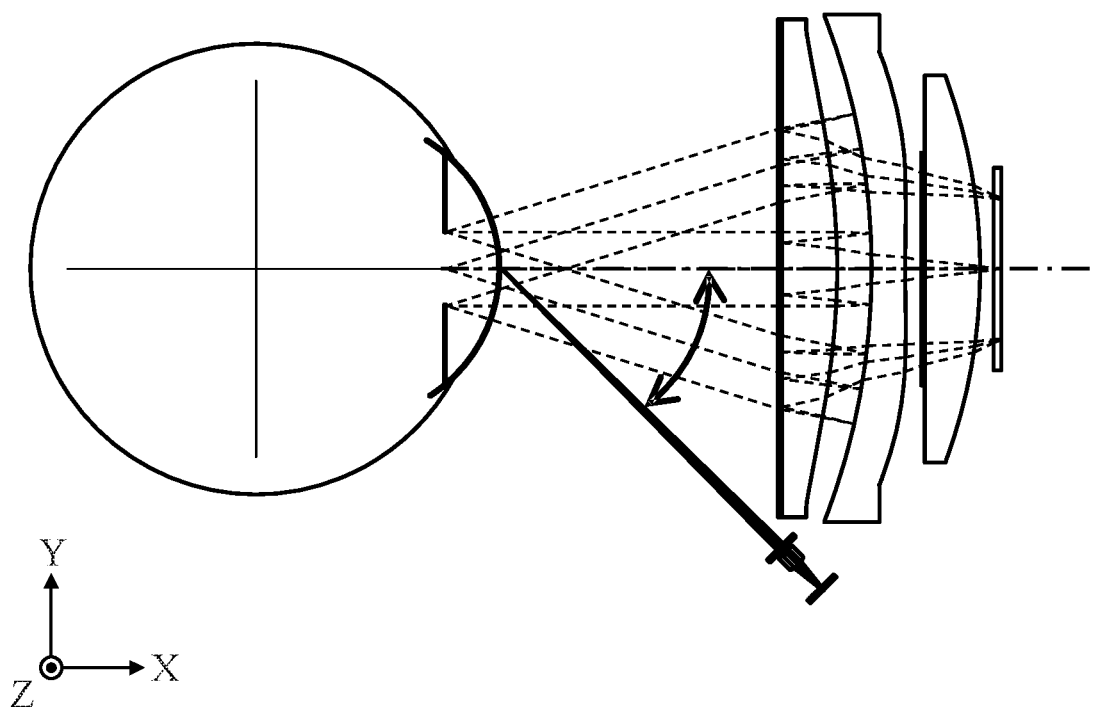
FIG. 7 is a sectional view of an optical system according to a comparative example.

Referring now to FIGS. 1 to 6, a description will be given of a configuration utilizing polarization. FIG. 6 explains a configuration utilizing polarization for the eyepiece optical system.

The first half-transmissive reflective surface HM1 includes, in order from the side of the exit pupil SP, a polarization selective half-transmissive half-reflective element (PBS) and a first quarter waveplate (QWP1). The second half-transmissive reflective surface HM2 includes a half-mirror made, for example, of a dielectric multilayer film or metal vapor deposition. A second quarter waveplate (QWP2) and a linear polarization plate (POL) are disposed between the half-mirror (second half-transmissive reflection surface HM2) and the image display surface ID.

A polarization-selective half-transmissive reflective element (PBS) is an element configured to reflect linearly polarized light polarized in the same direction as that of light passing through the linear polarization plate (POL) and to transmit linearly polarized light orthogonal to that direction. The polarization-selective half-transmissive reflective element (PBS) is, for example, a wire grid polarizer, and the wire grid forming surface functions as a half-transmissive half-reflective surface. A first quarter waveplate (QWP1) and a second quarter waveplate (QWP2) are arranged so that their slow axes are tilted by 90°. The first quarter waveplate (QWP1) is disposed so that its slow axis is tilted by 45° relative to a polarization transmission axis of the linear polarization plate (POL).

The light emitted from the image display surface ID becomes linearly polarized light by the linear polarization plate (POL), becomes circularly polarized light by the second quarter waveplate (QWP2), and enters the half-mirror (second half-transmissive reflective surface HM2). Part of the light that has reached the half-mirror (second half-transmissive reflective surface HM2) is reflected to become circularly polarized light that is polarized in the reverse rotating direction and returns to the second quarter waveplate (QWP2). The circularly polarized light that is polarized in the reverse rotating direction and has returned to the second quarter waveplate (QWP2) is converted by the second quarter waveplate (QWP2) into linearly polarized light that is polarized in a direction orthogonal to a direction of the light after previously passing through the linear polarization plate (POL), and returns to and is absorbed by the linear polarization plate (POL).

Part of the light that has reached the half-mirror (second half-transmissive reflective surface HM2) transmits through the half-mirror (second half-transmissive reflective surface HM2). Thereafter, the first quarter waveplate (QWP1) converts the light into linearly polarized light that is polarized in the same direction as that of the light after previously passing through the linear polarization plate (POL), and enters the polarization-selective half-transmissive reflective element (PBS). The linearly polarized light that is polarized in the same direction as that of the light after previously passing through the linear polarization plate (POL) is reflected by the polarization selectivity of the polarization-selective half-transmissive reflective element (PBS). The light reflected by the polarization-selective half-transmissive reflective element (PBS) is converted by the first quarter waveplate (QWP1) into circularly polarized light that is polarized in a rotating direction reverse to that of the light after being previously converted into circularly polarized by the second quarter waveplate (QWP2), and enters the half-mirror (second half-transmissive reflection surface HM2).

The light reflected by the half-mirror (second half-transmissive reflective surface HM2) becomes circularly polarized light that is polarized in a direction reverse to that of the pre-reflection light. Thereafter, the light enters the first quarter waveplate (QWP1) and becomes linearly polarized light that is polarized in a direction orthogonal to that of the light after previously passing through the linear polarization plate (POL), and enters the polarization-selective half-transmissive reflective element (PBS).

The linearly polarized light that is polarized in the direction orthogonal to that of the light after previously passing through a linear polarization plate (POL) transmits through the polarization-selective half-transmissive reflective element (PBS) due to the polarization selectivity of the polarization-selective half-transmissive reflective element (PBS) and is guided to the exit pupil SP.

As described above, the light that has transmitted through the half-mirror (second half-transmissive reflective surface HM2), been reflected by the polarization selective half-transmissive reflective element (PBS), been reflected by the half-mirror (second half-transmissive reflective surface HM2), and transmitted through the polarization-selective half-transmissive reflective element (PBS) is guided to the exit pupil SP.

Example 1

Referring now to FIG. 1, a description will be given of an observation apparatus according to this example.

The observation apparatus according to this example includes, in order from the side of the exit pupil SP to the side of the image display surface ID, a first lens G1, a second lens G2, and a third lens G3. The first half-transmissive reflective surface HM1 is provided on the side of the exit pupil SP of the first lens G1. The second half-transmissive reflective surface HM2 is provided on the side of the exit pupil SP of the second lens G2. The observation apparatus according to this example includes an image display element and a camera CAM that includes an image sensor. The observation apparatus according to this example includes an eyepiece optical system as the coaxial optical system having a diagonal viewing angle of about 58 degrees and an imaging optical system. The image display surface ID has an aspect ratio of 4:3. A dotted line indicates an effective light beam (luminous flux) in the observation optical path, and a solid line indicates an effective light beam in the imaging optical path.

In the observation optical path, the light from the image display surface ID transmits through the second half-transmissive reflective surface HM2, is reflected by the first half-transmissive reflective surface HM1, is reflected by the second half-transmissive reflective surface HM2, transmits through the first half-transmissive reflective surface HM1, and is guided to the exit pupil SP. Using a triple-pass configuration for the eyepiece optical system can achieve both a wide viewing angle and a low profile of the observation apparatus.

In the imaging optical path, the light transmits through the first half-transmissive reflective surface HM1, transmits through the second half-transmissive reflective surface HM2, and is guided to the image sensor. This configuration can reduce the imaging angle on the side of the exit pupil SP in the imaging optical system.

The refractive area RR is disposed outside the optically effective area of the observation optical path and inside the optically effective area of the imaging optical path. Thereby, the camera CAM (image sensor) can be located closer to the optical axis of the eyepiece optical system, and the imaging angle on the side of the exit pupil SP of the imaging optical system can be further reduced. In this example, the refractive area RR is a spherical surface rotationally symmetrical with respect to the optical axis of the observation optical path.

Example 2

Figure 2:
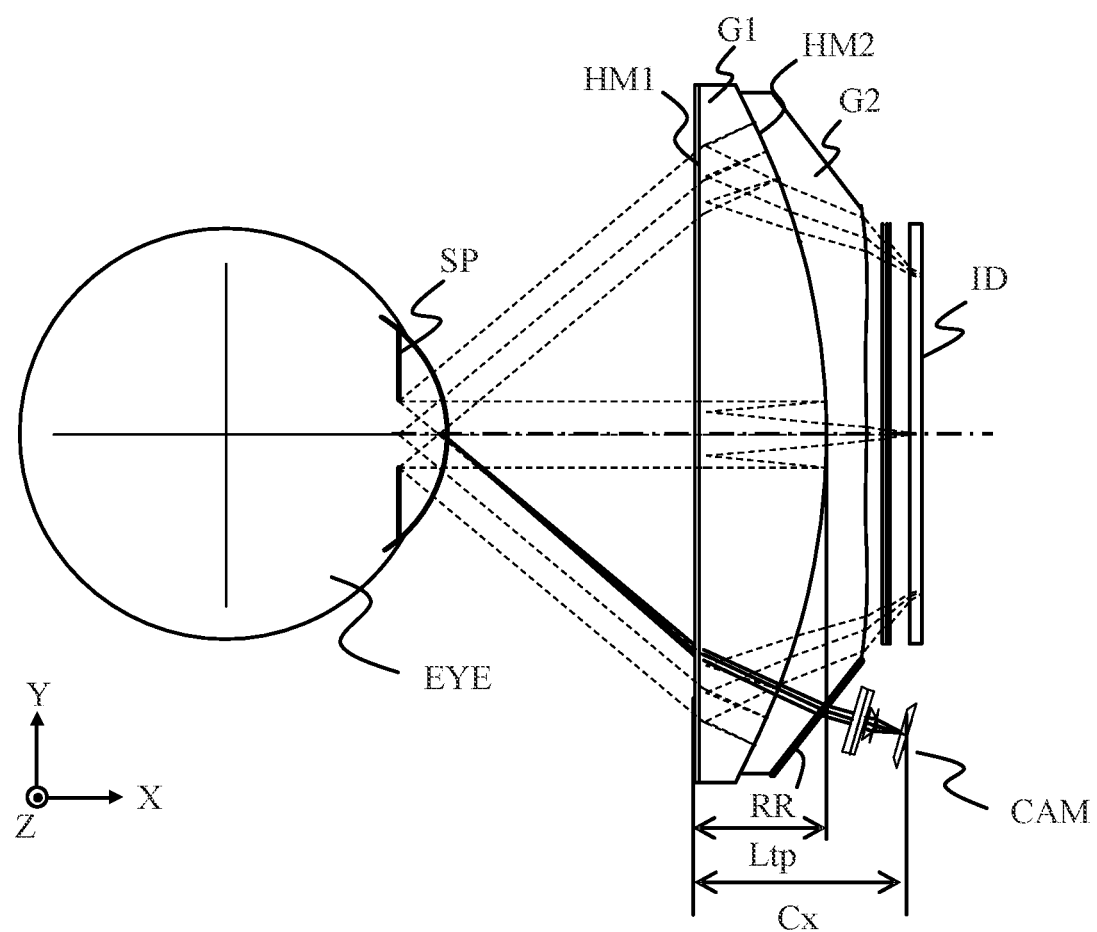
FIG. 2 is a sectional view of an optical system according to example 2.

Referring now to FIG. 2, a description will be given of an observation apparatus according to this example.

The basic configuration of the observation apparatus according to this example is similar to that of the observation apparatus of Example 1. This example is different from Example 1 in the configuration of the eyepiece optical system and the arrangement of the imaging optical system.

This example will discuss a configuration different from that of Example 1, and a description of the configuration similar to that of Example 1 will be omitted.

The observation apparatus according to this example includes, in order from the side of the exit pupil SP to the side of the image display surface ID, a first lens G1 and a second lens G2. The first half-transmissive reflective surface HM1 is provided on the side of the exit pupil SP of the first lens G1. The second half-transmissive reflective surface HM2 is provided on the side of the exit pupil SP of the second lens G2.

The eyepiece optical system according to this example has a diagonal viewing angle of about 80 degrees, and includes a single cemented lens.

The refractive area RR is disposed outside the optically effective area of the observation optical path and inside the optically effective area of the imaging optical path. In this example, the refractive area RR is a conical surface rotationally symmetrical with respect to the optical axis of the viewing optical path.

Example 3

Figure 3:
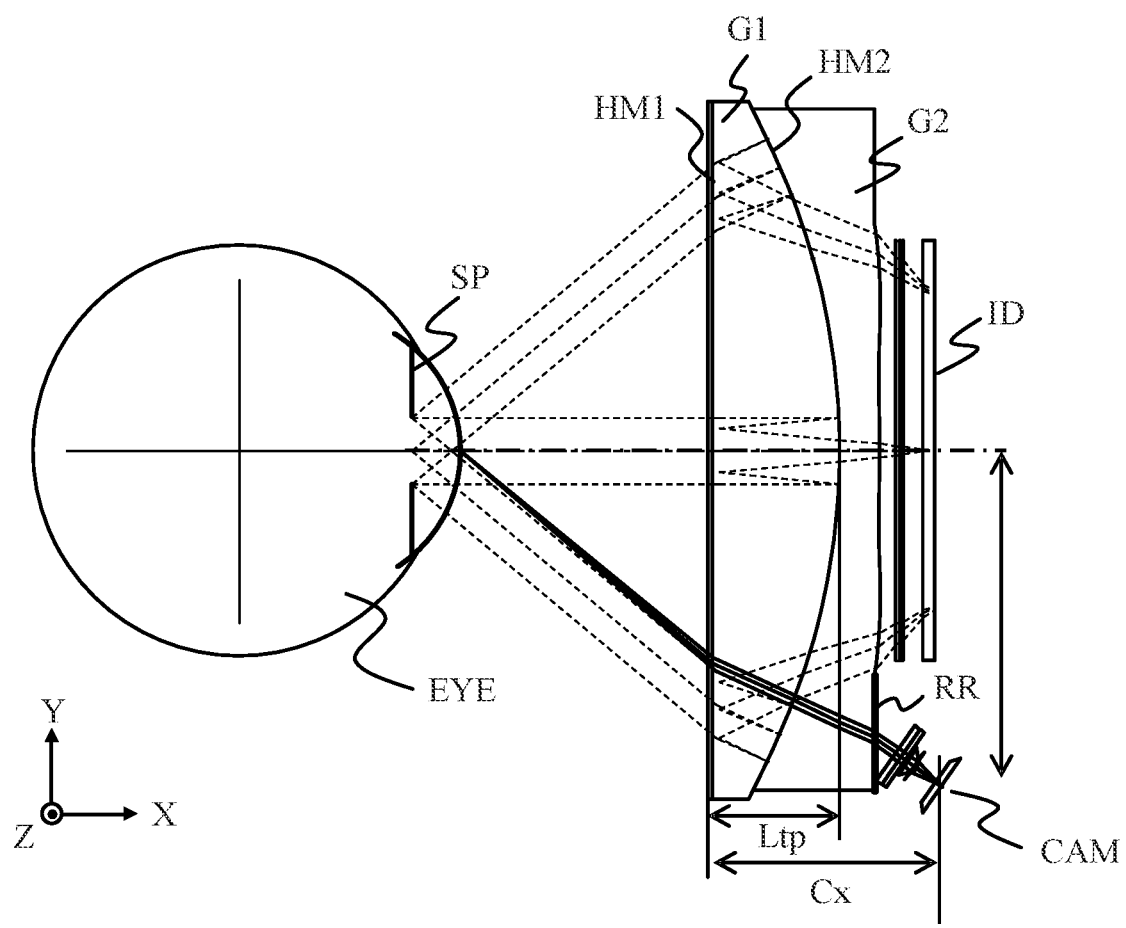
FIG. 3 is a sectional view of an optical system according to example 3.

Referring now to FIG. 3, a description will be given of an observation apparatus according to this example.

The basic configuration of the observation apparatus according to this example is similar to that of the observation apparatus of Example 2. This example is different from Example 2 in the configuration of the refractive area RR. In this example, a configuration different from that of the second example will be described, and a description of the configuration similar to that of Example 2 will be omitted.

In this example, the refractive area RR is a plane rotationally symmetrical with respect to the optical axis of the observation optical path. Making the refractive area RR plane can reduce asymmetrical aberration, particularly an astigmatism component, caused by the refraction of the refractive area RR.

Example 4

Referring now to FIG. 4, a description will be given of an observation apparatus according to this example.

The basic configuration of the observation apparatus according to this example is similar to that of the observation apparatus of Example 2. This example is different from Example 2 in that the optical element OE that is rotationally asymmetric is disposed on the image sensor side of the refractive area RR. This example will discuss a configuration different from that of Example 2, and a description of the configuration similar to that of Example 2 will be omitted.

The optical element OE plays a role in correcting the asymmetrical aberration that would otherwise occur in the refractive area RR as a conical surface. Cementing the optical element OE with the refractive area RR and making flat a surface on the image sensor side of the optical element OE can satisfactorily correct the asymmetrical aberration remaining in the imaging optical system, especially the astigmatism component.

Example 5

Referring now to FIG. 5, a description will be given of an observation apparatus according to this example.

The basic configuration of the observation apparatus according to this example is similar to that of the observation apparatus of Example 1. This example is different from Example 1 in the configuration of the eyepiece optical system and the arrangement of the imaging optical system. This example will discuss a configuration different from that of Example 1, and a description of the configuration similar to that of the first example will be omitted.

The observation apparatus according to this example includes, in order from the side of the exit pupil SP to the side of the image display surface ID, first to seventh lenses G1 to G7. The first half-transmissive reflective surface HM1 is provided on the side of the exit pupil SP of the first lens G1. The second half-transmissive reflective surface HM2 is provided on the side of the exit pupil SP of the second lens G2.

The eyepiece optical system according to this example has a diagonal viewing angle of about 69 degrees and is configured to form an intermediate image.

The first half-transmissive reflective surface HM1 is a plane, and the first lens G1 and the second lens G2 are formed as a cemented lens made of the same material. Due to this configuration, the common use portion of the eyepiece optical system and the imaging optical system can be regarded as a parallel plate, so that the influence on aberration can be minimized. At this time, it is unnecessary to design the camera CAM dedicated to imaging of the exit pupil SP, and a general camera module can be used.

The eyepiece optical system according to this example includes the first lens G1 and the second lens G2 of the same material as described above, and is regarded as a parallel plate. The first half-transmissive reflective surface HM1 on the side of the exit pupil SP of the first lens G1 is disposed as a polarization-selective half-transmissive half-reflective element and a quarter waveplate. A quarter waveplate is disposed on the surface on the side of the image display surface IP of the second lens G2, and a reflective surface (ninth surface of numerical example 3) is disposed as a plane combiner that includes a polarization-selective half-transmissive half-reflective element. This configuration can realize a so-called optical see-through type eyepiece optical system in which the external light passes through the cemented lens in a single pass and is observed at approximately equal magnification, and the image light of the image display element passes through the cemented lens in a triple pass to be observed in an enlarged manner.

A description will now be given of numerical example 1 corresponding to Example 1, numerical example 2 corresponding to Examples 2 to 4, and numerical example 3 corresponding to Example 3.

In the surface data in each numerical example, r denotes a radius of curvature of each optical surface, and d (mm) denotes an on-axis distance (distance on the optical axis) between an m-th surface and an (m+1)-th surface, where m is a surface number counted from the side of the exit pupil SP. nd denotes a refractive index for the d-line of each optical member, and νd denotes an Abbe number of an optical element. The Abbe number νd of a certain material is expressed as follows:

$$\nu d = (Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

The viewing angle is a viewing angle in the short side direction of the image display surface ID.

In a case where the optical surface is an aspherical surface, an asterisk * is attached to the right side of the surface number. The aspherical shape is expressed as follows:

$$X=(h^2/R)/[1+\{1-(1+K)(h/R)^2\}^{1/2}+A4\cdot h^4+A6\cdot h^6+A8\cdot h^8+A10\cdot h^{10}$$

where X is a displacement amount from a surface vertex in the optical axis direction, h is a height from the optical axis in a direction orthogonal to the optical axis, R is a paraxial radius of curvature, K is a conical constant, A4, A6, A8, and A10 are aspherical coefficients of respective orders. "e±XX" in each a spherical coefficient means "$\times 10^{\pm XX}$."

Numerical Example 1

UNIT: mm

Surface Data

| Surface No. | r | d | nd | vd | Effective Diameter(Y, Z) |
|---|---|---|---|---|---|
| 1(Aperture Stop) | ∞ | 18.00 | | | 4.0 |
| 2 | ∞ | 0.20 | 1.50000 | 50.0 | 27.5 |
| 3 | ∞ | 3.00 | 1.53000 | 55.9 | 27.5 |
| 4* | −38.483 | 1.87 | (Reflective Surface: HM2) | | 27.5 |
| 5 | −38.005 | −1.87 | (Reflective Surface: HM1) | | 27.5 |
| 6* | −38.483 | −3.00 | 1.53000 | 55.9 | 27.5 |
| 7 | ∞ | 3.00 | | | 27.5 |
| 8* | −38.483 | 1.87 | | | 27.5 |
| 9 | −38.005 | 1.83 | 1.63600 | 23.9 | 27.5 |
| 10* | 99.896 | 0.85 | | | 23.5 |
| 11 | ∞ | 0.20 | 1.50000 | 50.0 | (12.6, 21.0) |
| 12 | ∞ | 3.00 | 1.48749 | 70.2 | 21.0 |
| 13 | −30.050 | 0.76 | | | 21.0 |
| 14 | ∞ | 0.40 | 1.51633 | 64.1 | (8.2, 11.0) |
| 15 | ∞ | 0.00 | | | (8.2, 11.0) |
| Image Plane | ∞ | | | | |

Aspheric Data

4th Surface

K = 0.00000e+00 A 4 = 1.14783e−05 A 6 = 8.12048e−08
A 8 = −3.42503e−10 A10 = 1.00372e−12

6th Surface

K = 0.00000e+00 A 4 = 1.14783e−05 A 6 = 8.12048e−08
A 8 = −3.42503e−10 A10 = 1.00372e−12

8th Surface

K = 0.00000e+00 A 4 = 1.14783e−05 A 6 = 8.12048e−08
A 8 = −3.42503e−10 A10 = 1.00372e−12

10th Surface

K = 0.00000e+00 A 4 = −2.17485e−04 A 6 = 1.14074e−06
A 8 = −3.03928e−09 A10 = 2.89322e−12

Various data

| Focal Length | 12.97 |
| Pupil Diameter | 4.00 |
| Viewing Angle | 17.20 |
| Overall lens length | 12.11 |

SINGLE LENS DATA

| Lens | Starting Surface | Focal Length |
|---|---|---|
| SP | 1 | 0.00 |
| POL | 2 | 0.00 |
| G1 | 3 | 72.61 |
| G2 | 9 | −43.07 |
| POL | 11 | 0.00 |
| G3 | 12 | 61.64 |
| CG | 14 | 0.00 |

Numerical Example 2

| UNIT: mm | | | | | |
|---|---|---|---|---|---|
| Surface Data | | | | | |
| Surface No. | r | d | nd | vd | Effective Diameter |
| 1(Aperture Stop) | ∞ | 18.00 | | | 4.0 |
| 2 | ∞ | 0.20 | 1.50000 | 50.0 | 38.0 |
| 3 | ∞ | 7.00 | 1.53000 | 55.9 | 38.0 |
| 4* | −41.951 | −7.00 | (Reflective Surface: HM2) | | 38.0 |
| 5 | ∞ | 7.00 | (Reflective Surface: HM1) | | 38.0 |
| 6* | −41.951 | 2.40 | 1.63600 | 23.9 | 38.0 |
| 7* | −73.131 | 0.95 | | | 27.0 |
| 8 | ∞ | 0.30 | 1.50000 | 50.0 | 30.0 |
| 9 | ∞ | 0.30 | 1.50000 | 50.0 | 30.0 |
| 10 | ∞ | 1.25 | | | 30.0 |
| 11 | ∞ | 0.70 | 1.51633 | 64.1 | 30.0 |
| 12 | ∞ | 0.00 | | | 30.0 |
| Image Plane | ∞ | | | | |

Aspheric Data

4th Surface

K = 0.00000e+00 A 4 = −2.58220e−06 A 6 = 1.47199e−08
A 8 = −5.32418e−11 A10 = 7.50680e−14

6th Surface

K = 0.00000e+00 A 4 = −2.58220e−06 A 6 = 1.47199e−08
A 8 = 5.32418e−11 A10 = 7.50680e−14

7th Surface

K = 0.00000e+00 A 4 = 1.82030e−04 A 6 = −1.33313e−06
A 8 = 2.80530e−09

Various data

| Focal Length | 13.50 |
|---|---|
| Pupil Diameter | 4.00 |
| Viewing Angle | 40.00 |
| Overall lens length | 13.10 |

SINGLE LENS DATA

| Lens | Starting Surface | Focal Length |
|---|---|---|
| SP | 1 | 0.00 |
| POL | 2 | 0.00 |
| G1 | 3 | 79.15 |
| G2 | 6 | −159.48 |
| POL | 8 | 0.00 |
| POL | 9 | 0.00 |
| CG | 11 | 0.00 |

Numerical Example 3

| UNIT: mm | | | | | |
|---|---|---|---|---|---|
| Surface Data | | | | | |
| Surface No. | r | d | nd | vd | Effective Diameter(Y, Z) |
| 1(Aperture Stop) | ∞ | 19.00 | | | 4.0 |
| 2 | ∞ | 0.20 | 1.50000 | 50.0 | 43.0 |
| 3 | ∞ | 4.38 | 1.54400 | 56.0 | 43.0 |
| 4* | −80.834 | −4.38 | (Reflective Surface: HM2) | | 43.0 |
| 5 | ∞ | 4.38 | (Reflective Surface: HM1) | | 43.0 |
| 6* | −80.834 | 1.50 | 1.54400 | 56.0 | 43.0 |
| 7 | ∞ | 0.20 | 1.50000 | 50.0 | (32.0, 43.0) |
| 8 | ∞ | 15.47 | | | (32.0, 43.0) |
| 9 | ∞ | −14.80 | (Reflective Surface) | | (21.0, 17.0) |

-continued

| | | | UNIT: mm | | |
|---|---|---|---|---|---|
| 10 | 98.671 | 38.80 | (Reflective Surface) | | (12.0, 15.0) |
| 11 | 16.049 | 3.47 | 1.95375 | 32.3 | 14.5 |
| 12 | −69.698 | 2.09 | | | 14.0 |
| 13 | −19.195 | 2.01 | 1.85150 | 40.8 | 12.7 |
| 14 | −11.340 | 1.20 | 1.95906 | 17.5 | 12.5 |
| 15 | −65.988 | 2.59 | | | 13.4 |
| 16 | 12.157 | 6.50 | 1.65160 | 58.5 | 15.7 |
| 17 | −23.061 | 0.66 | | | 14.7 |
| 18* | 63.474 | 3.50 | 1.63600 | 23.9 | 12.8 |
| 19* | 20.422 | 3.55 | | | 12.1 |
| 20 | ∞ | 0.70 | 1.51633 | 64.1 | 13.7 |
| 21 | ∞ | 0.00 | | | 13.7 |
| Image Plane | ∞ | | | | |

Aspheric Data

4th Surface $K = 0.00000e+00$ $A4 = 7.33649e-07$ $A6 = -1.66877e-09$
$A8 = 5.28772e-12$ $A10 = -5.05759e-15$ 6th Surface $K = 0.00000e+00$ $A4 = 7.33649e-07$ $A6 = -1.66877e-09$
$A8 = 5.28772e-12$ $A10 = -5.05759e-15$ 18th Surface $K = 0.00000e+00$ $A4 = -5.74635e-04$ 19th Surface $K = 0.00000e+00$ $A4 = 5.49158e-05$ $A6 = 6.48873e-06$ Various data

| Focal Length | −9.05 |
|---|---|
| Pupil Diameter | 4.00 |
| Viewing Angle | 22.90 |
| Overall lens length | 129.38 |

SINGLE LENS DATA

| Lens | Starting Surface | Focal Length |
|---|---|---|
| SP | 1 | 0.00 |
| POL | 2 | 0.00 |
| G1 | 3 | 148.59 |
| G2 | 6 | −148.59 |
| POL | 7 | 0.00 |
| G3 | 11 | 13.95 |
| G4 | 13 | 29.12 |
| G5 | 14 | −14.43 |
| G6 | 16 | 13.18 |
| G7 | 18 | −48.89 |
| CG | 20 | 0.00 |

TABLE 1

| Example | Ltp | Cx | Inequality(1) |
|---|---|---|---|
| 1 | 14.81 | 14.0 | 0.945 |
| 2 | 14.20 | 13.1 | 0.923 |
| 3 | 14.20 | 14.2 | 1.000 |
| 4 | 14.20 | 15.3 | 1.077 |
| 5 | 13.34 | 11.0 | 0.825 |

Each of the above examples can provide a small and thin optical system with a wide viewing angle and high optical performance, and an observation apparatus having the same.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-201273, filed on Dec. 10, 2021, which is hereby incorporated by reference herein in its entirety.

What is claimed is:

1. An optical system configured to form an enlarged image of a display surface of an image display element, the optical system comprising, in order from a side of an exit pupil to a side of the display surface, a first half-transmissive reflective surface and a second half-transmissive reflective surface,
    wherein the optical system has:
        a first optical path on which light from the display surface transmits through the second half-transmissive reflective surface, is reflected by the first half-transmissive reflective surface, is reflected by the second half-transmissive reflective surface, transmits through the first half-transmissive reflective surface, and is guided to the exit pupil, and a second optical path on which light from the side of the exit pupil transmits through the first half-transmissive reflective surface, transmits through the second half-transmissive reflective surface, and is guided to an image sensor, wherein the following inequality is satisfied:

$$0.5 < Cx/Ltp < 1.5$$

where Ltp is a distance on an optical axis of the first optical path from a surface closest to the exit pupil to the second half-transmissive reflective surface, and Cx is a distance on the optical axis of the first optical path from a surface closest to the exit pupil to a center of the image sensor.

2. The optical system according to claim 1, further comprising a refractive area disposed outside an optically effective area of the first optical path and inside an optically effective area of the second optical path.

3. The optical system according to claim 2, wherein in the second optical path, the light from the side of the exit pupil transmits through the first half-transmissive reflective surface, transmits through the second half-transmissive reflective surface, transmits through the refractive area, and is guided to the image sensor.

4. The optical system according to claim 3, wherein the refractive area is a refractive surface.

5. The optical system according to claim 4, wherein the refractive surface is rotationally symmetrical with respect to an optical axis of the first optical path.

6. The optical system according to claim 4, wherein the refractive surface is a plane.

7. The optical system according to claim 4, further comprising an optical element that is rotationally asymmetric and disposed closer to the image sensor than the refractive surface in the second optical path.

8. The optical system according to claim 7, wherein an optically effective surface on a side of the image sensor of the optical element is a plane.

9. The optical system according to claim 7, wherein the optical element is cemented with the refractive surface.

10. The optical system according to claim 2, wherein the first half-transmissive reflective surface is a plane.

11. The optical system according to claim 2, wherein the first half-transmissive reflective surface is a surface provided on a polarization-selective reflection type polarizing element.

12. The optical system according to claim 2, further comprising a circular polarization conversion element disposed closer to the display surface than the second half-transmissive reflective surface.

13. The optical system according to claim 12, wherein the circular polarization conversion element includes a linear polarization plate and a quarter waveplate.

14. The optical system according to claim 13, wherein the linear polarization plate is disposed within the first optical path.

15. The optical system according to claim 1, wherein the optical system includes a single cemented lens.

16. The optical system according to claim 1, further comprising:
   an eyepiece optical system that is a coaxial optical system using the first optical path; and
   an imaging optical system using the second optical path.

17. The optical system according to claim 1, wherein the distance on an optical axis of the first optical path from the surface closest to the exit pupil to the second half-transmissive reflective surface is the distance by adding distance on the optical axis from the surface closest to the exit pupil to the first half-transmissive reflective surface and three times the distance on the optical axis from the first half-transmissive reflective surface to the second half-transmissive reflective surface.

18. An observation apparatus comprising:
   an image display element;
   an image sensor; and
   an optical system configured to form an enlarged image of a display surface of the image display element, the optical system comprising, in order from a side of an exit pupil to a side of the display surface, a first half-transmissive reflective surface and a second half-transmissive reflective surface,
   wherein that the optical system has:
      a first optical path on which light from the display surface transmits through the second half-transmissive reflective surface, is reflected by the first half-transmissive reflective surface, is reflected by the second half-transmissive reflective surface, transmits through the first half-transmissive reflective surface, and is guided to the exit pupil, and
      a second optical path on which light from the side of the exit pupil transmits through the first half-transmissive reflective surface, transmits through the second half-transmissive reflective surface, and is guided to an image sensor,
   wherein the following inequality is satisfied:

$$0.5 < Cx/Ltp < 1.5$$

where Ltp is a distance on an optical axis of the first optical path from a surface closest to the exit pupil to the second half-transmissive reflective surface, and Cx is a distance on the optical axis of the first optical path from a surface closest to the exit pupil to a center of the image sensor.

19. An optical system configured to form an enlarged image of a display surface of an image display element, the optical system comprising, in order from a side of an exit pupil to a side of the display surface, a first half-transmissive reflective surface and a second half-transmissive reflective surface,
   wherein the optical system has:
      a first optical path on which light from the display surface transmits through the second half-transmissive reflective surface, is reflected by the first half-transmissive reflective surface, is reflected by the second half-transmissive reflective surface, transmits through the first half-transmissive reflective surface, and is guided to the exit pupil, and
      a second optical path on which light from the side of the exit pupil transmits through the first half-transmissive reflective surface, transmits through the second half-transmissive reflective surface, and is guided to an image sensor,
      a refractive area disposed outside an optically effective area of the first optical path and inside an optically effective area of the second optical path, and the refractive area is a refractive surface, and
      an optical element that is rotationally asymmetric and disposed closer to the image sensor than the refractive surface in the second optical path,
   wherein in the second optical path, the light from the side of the exit pupil transmits through the first half-transmissive reflective surface, transmits through the second half-transmissive reflective surface, transmits through the refractive area, and is guided to the image sensor.

20. An optical system configured to form an enlarged image of a display surface of an image display element, the optical system comprising, in order from a side of an exit pupil to a side of the display surface, a first half-transmissive reflective surface and a second half-transmissive reflective surface, wherein the optical system has:
- a first optical path on which light from the display surface transmits through the second half-transmissive reflective surface, is reflected by the first half-transmissive reflective surface, is reflected by the second half-transmissive reflective surface, transmits through the first half-transmissive reflective surface, and is guided to the exit pupil, and
- a second optical path on which light from the side of the exit pupil transmits through the first half-transmissive reflective surface, transmits through the second half-transmissive reflective surface, and is guided to an image sensor,
- a refractive area disposed outside an optically effective area of the first optical path and inside an optically effective area of the second optical path,
- a circular polarization conversion element disposed closer to the display surface than the second half-transmissive reflective surface.

* * * * *